June 9, 1959     G. M. WANINGER     2,889,756
MACHINE TOOLS
Filed March 28, 1955
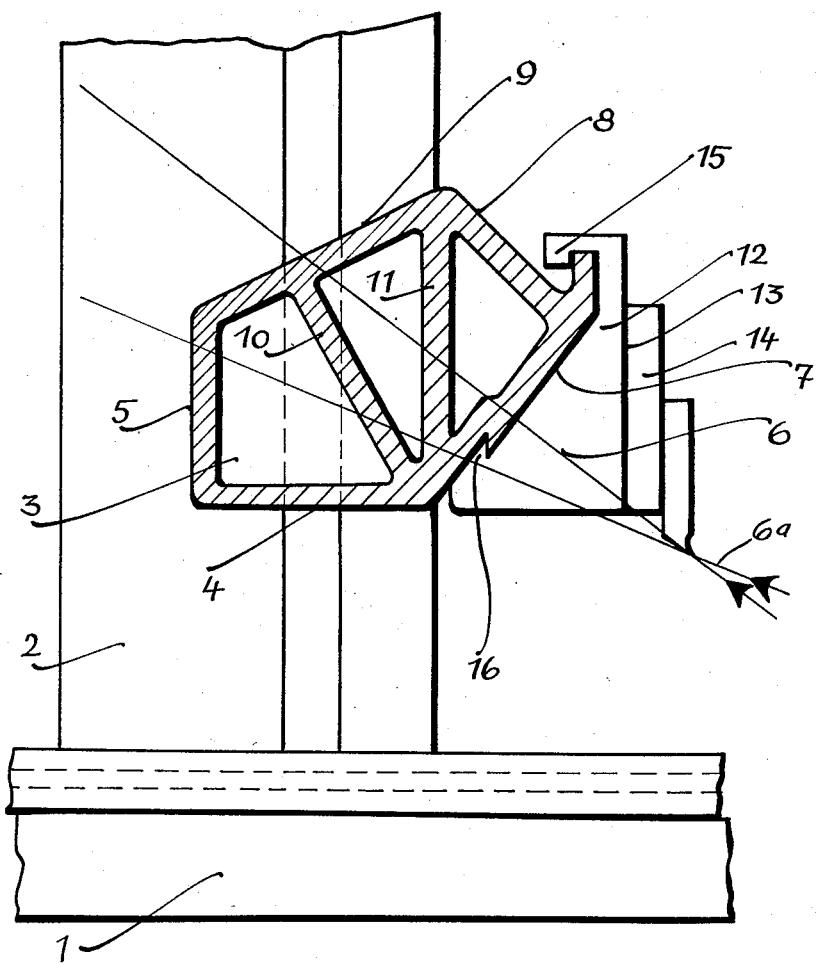
Inventor,
GILBERT M. WANINGER

United States Patent Office 2,889,756
Patented June 9, 1959

2,889,756
MACHINE TOOLS

Gilbert M. Waninger, Ettlingen, Baden, Germany

Application March 28, 1955, Serial No. 497,301

Claims priority, application Germany April 2, 1954

1 Claim. (Cl. 90—37)

The cross beam hitherto used on planing machines presents guiding surfaces for the tool head or heads slidable thereon which extend substantially vertically. This is because it is desired to have as little overhang of the tool in front of the columns as possible. This arrangement, however, makes it impossible to avoid the beam presenting an inefficient section to resist the bending stresses imposed by the main cutting forces, namely, a rectangular section with its long side set vertically which is disadvantageous since the resultant cutting force on the tool is at an angle of about 20° to 45° to the horizontal and therefore intersects the rectangular cross section in a sloping fashion so that under this load the beam is exposed to torsion. With the increased requirements for great stiffness of the whole construction this undesirable loading, in particular in double column planing machines with wide spacing between the columns but also even in other cases, can lead to the result that full utilization of the high output possibilities of hard metal tools cannot be achieved and the cutting speed has to be reduced in operation on account of insufficient stiffness of the whole construction, in particular that of the cross beam, compared with the cutting speed which the tool could sustain.

According to the present invention this disadvantage is overcome by arranging the mean guiding plane for the tool head or heads inclined in relation to the working direction so that the median or average resultant force arising in operation meets the mean guiding plane substantially perpendicularly.

By the term "mean guiding plane" in the case of two part-guiding surfaces, that plane is to be understood which connects the centre lines of the two part-guiding surfaces. These part-guiding surfaces can then lie each in this inclined plane or parallel to one another so that then the part-guiding surfaces are arranged in stepped formation and inclined, one behind and below the other. Similar considerations apply when there are more than two part-guiding surfaces. It will be understood that according to the loading and operating conditions the resultant force may vary between the above mentioned limits of about 20°–45° to the horizontal and that in machining the sides of a workpiece there will also be a lateral angle in relation to the vertical mid-plane through the machine. The important thing is, however, that inclined loading of the guiding surfaces in cross section through the beam is to be avoided or reduced and the resultant, at least in planes transverse to the cross beam, is to be applied as nearly as possible perpendicular to the guiding surfaces.

The general view has already been expressed in connection with machine tools that the guiding surfaces should be arranged perpendicular to the average resultant force acting upon them. On double column machines this idea has not found any use at all because on one hand this general idea was not looked upon as a basic necessity which was to be satisfied by all or the greater part of the guide surfaces, and on the other hand it was not recognized that with the fulfilment of this basic requirement the stiffness of plano-milling machines would be so much increased that the cutting speeds and the life of the tools would increase in the same measure; and finally because those skilled in the art avoided providing inclined guiding surfaces at this place because production difficulties were feared, which have however been shown to bear no relationship to the advantages obtained thereby.

The consequence of this arrangement according to the invention is however not merely that the stiffness of clamping between the tool head and the cross beam is substantially increased because the resultant force no longer tends to move the tool head laterally on the cross beam, that is, in the vertical direction, but presses the tool head firmly against the guiding surfaces, but because in addition the cross section of the cross beam in general is changed from a rectangular form long side upwards to the form of a trapezoid, a pentagon, or at least of a triangle standing on its apex, and for these reasons without any further provision and simply due to the arrangement of the guiding surfaces in accordance with the invention is made stiff in torsion in comparison with the prior arrangements.

The invention provides various possibilities for the construction of the tool head. In the first place it is possible to leave it unchanged so that it also is set at an angle to the vertical and the tool slide moves in an inclined direction towards the workpiece. Such an arrangement could be used and compensated for by giving the tool shank or its cutting surfaces a suitable form. Then the resultant force would still be at right angles to the guiding surfaces of the cross beam. But as the point of application of the resultant force acts on the cutting edges of the tool, that is outside these guiding surfaces, a relatively high tipping moment acts on the tool slide.

In order to obtain better conditions according to a further development of the invention, the guides for the part of the tool head movable in relation to the workpiece, that is the tool slide, are arranged in the manner in itself known, vertically. From this results a new and in itself advantageous construction of the tool head which is particularly strongly constructed at the part most heavily loaded while the part of the tool head which engages the upper guide on the cross beam and which is loaded in tension by the tipping moment always present, is made correspondingly lighter.

Along with this, there is the possibility of giving the tool head, so far as this is necessary or desirable, a different angular setting in relation to the inclined arrangement according to the invention of the guiding surfaces for the tool head on the cross beam, so that for example the tool slide not only differs in its direction of movement in relation to the guiding surfaces of the cross beam on account of the inclination to these surfaces but has its direction of movement carried beyond that which is perpendicular to the work table in its angle in relation to the inclined guiding surfaces of the cross beam, that is to say, is brought still nearer the direction of the resultant forces. This is so because according to the invention the guides for the tool slide are no longer parallel to the guiding surfaces for the tool head on the cross beam, but the guides and guiding surfaces define an angle which is so chosen that the tipping moment on the tool and the bending moment on the tool slide are reduced.

The accompanying drawing illustrates an example embodying the present invention diagrammatically in cross section through the cross beam.

The bed 1 and columns 2 of a planing machine are constructed in the usual manner while according to the invention the cross beam 3 has in section a substantially pentagonal form which is made up of a horizontal lower wall 4, a rear wall 5 perpendicular thereto, a guide wall 7 which according to the invention is perpendicular to the mean or median resultant force 6 and makes an obtuse angle to the lower wall 4, an upper wall 8 at about a right angle to the guide face or wall 7 and a connecting wall 9 joining the wall 8 to the rear wall 5.

Internal walls 10 and 11 serve to stiffen the beam.

In side view the tool head 12 is of substantially triangular form, that is, it is so constructed that its outer surface or guides 13 for a tool slide 14 run vertically.

The tool head 12 has an upper guide member 15 of more or less hook form by which it is suspended on the cross beam, the main guiding surfaces of which it engages with a dovetail part 16. Clamping of the tool head to the cross beam can be effected in known manner either at the top end or preferably in the lower part at 16.

The line 6 indicates a median resultant force at about 45°. A further line indicates a resultant force at a lower angle but even at this lower angle the force falls fairly squarely on the inclined guiding surfaces of the cross beam.

The illustrated example is a planing machine but the invention is obviously equally applicable to any other double column machine tool such as a plano-milling machine or a vertical lathe.

I claim:

In a planing machine, the combination of a bed adapted to support a travelling work-table, at least one column mounted on said bed, a cross-beam mounted on said column above the work-table and extending thereacross in a direction normal to the direction of travel thereof, said cross-beam being pentagonal in cross-section, the forward wall thereof being a tool-head guide wall forming an acute angle with the table, a tool-head removably mounted on said cross-beam, said tool-head being substantially a right-angled triangle in cross-section the hypotenuse of which lies against the guide wall and a tool-holding wall lies in a plane normal to the plane of the table, and a tool mounted on the tool-holder for engaging the work at such an angle that the median resultant force exerted against said guide wall is in a direction normal thereto during operation of the machine, said cross-beam including a wall extending from the lower end of the guide wall in a plane parallel to the work-table and a wall extending from the upper end of the guide-wall at substantially a right-angle thereto.

References Cited in the file of this patent

UNITED STATES PATENTS

| 490,721 | Pigott | Jan. 31, 1893 |
| 807,740 | Harley | Dec. 19, 1905 |
| 1,526,241 | Schneider | Feb. 10, 1925 |

FOREIGN PATENTS

| 148,750 | Australia | Oct. 23, 1952 |
| 527,867 | Germany | June 22, 1931 |
| 465,446 | Great Britain | May 7, 1937 |
| 725,662 | Great Britain | Mar. 9, 1955 |